United States Patent [19]
Karlsson et al.

[11] Patent Number: 6,018,663
[45] Date of Patent: Jan. 25, 2000

[54] FREQUENCY PACKING FOR DYNAMIC FREQUENCY ALLOCATION IN A RADIOCOMMUNICATION SYSTEM

[75] Inventors: Patrik Karlsson, Älta; Per-Arne Sandegren, Stockholm, both of Sweden

[73] Assignee: Telefonaktiebolaget LM Ericsson, Stockholm, Sweden

[21] Appl. No.: 08/790,017

[22] Filed: Jan. 28, 1997

[51] Int. Cl.$^7$ ................................................. H04Q 7/30
[52] U.S. Cl. ........................ 455/450; 455/452; 455/509; 455/513; 370/332; 370/343; 333/167
[58] Field of Search .................. 455/450, 451, 455/452, 453, 454, 509, 512, 513, 447, 466, 120, 121, 123, 125, 561; 370/252, 332, 341, 343; 333/167, 175

[56] References Cited

U.S. PATENT DOCUMENTS

| | | | |
|---|---|---|---|
| 4,794,635 | 12/1988 | Hess | 379/60 |
| 4,914,651 | 4/1990 | Lusignan | 370/343 |
| 5,285,178 | 2/1994 | Ahlberg | 333/24 |
| 5,473,292 | 12/1995 | Victorin | 333/17.1 |
| 5,574,974 | 11/1996 | Almgren et al. | 455/33.1 |

FOREIGN PATENT DOCUMENTS 753977    1/1977    European Pat. Off. .

OTHER PUBLICATIONS

International Search Report re PCT/SE98/00116 Date of mailing of search: Sep. 30, 1998.

M. Malmgren et al., "Slow Adaptive Channel Allocation for Automatic Frequency Planning", *International Conference on Universal Personal Communications*, pp. 260–264 (Sep. 29, 1996).

Håkan Eriksson, "Capacity Improvement by Adaptive Channel Allocation", *IEEE Global Telecomm. Conf.*, pp. 1355–1359 (Nov. 28–Dec. 1, 1988).

Y. Furuya et al., "Channel Segregation, A Distributed Adaptive Channel Allocation Scheme for Mobile Communication Systems", *Second Nordic Seminar on digital Land Mobile Radio Communication*, pp. 311–315, Stockholm, (Oct. 14–16, 1986).

G. Riva, "Performance Analysis of an Improved Dynamic Channel Allocation Scheme for Cellular Mobile Radio Systems", *42nd IEEE Veh. Tech. Conf.*, pp. 794–797 (1992).

European Standard Search Report re RS 98911 Date of completion of the search: Aug. 29, 1997.

T. Nishikawa et al., "16 Channel Dielectric Transmitter Multiplexer for cellular Base Stations", *38th IEEE Vehicular Technology Conference*, Phil., pp. 461–468 entire document (Jun. 15, 1988).

*Primary Examiner*—Lee Nguyen
*Attorney, Agent, or Firm*—Burns, Doane, Swecker & Mathis, L.L.P.

[57] ABSTRACT

In a telecommunications network, a method and apparatus for allocating channels include making signal quality measurements for channels that are in use or available for use and for channels that may become available for use. Spectral efficiency is enhanced by considering the exclusionary bandwidths associated with combiner filters tuned to currently allocated frequencies.

17 Claims, 8 Drawing Sheets

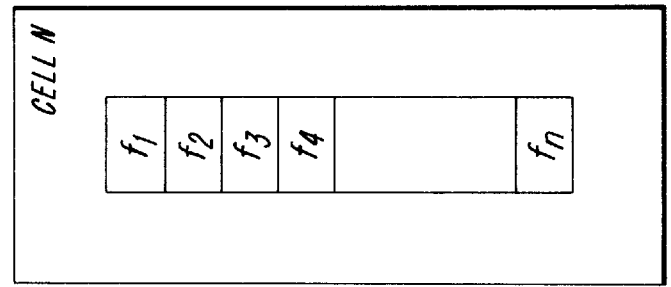
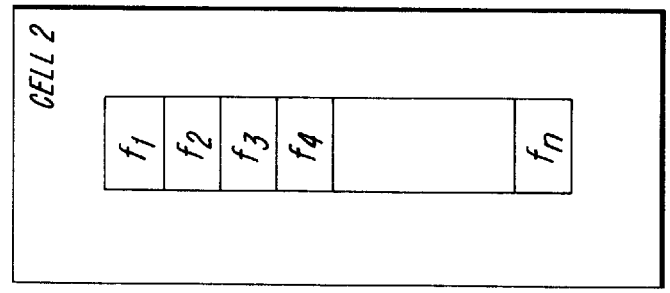
FIG. 2
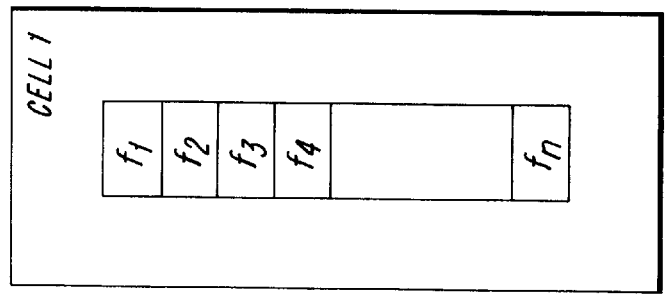

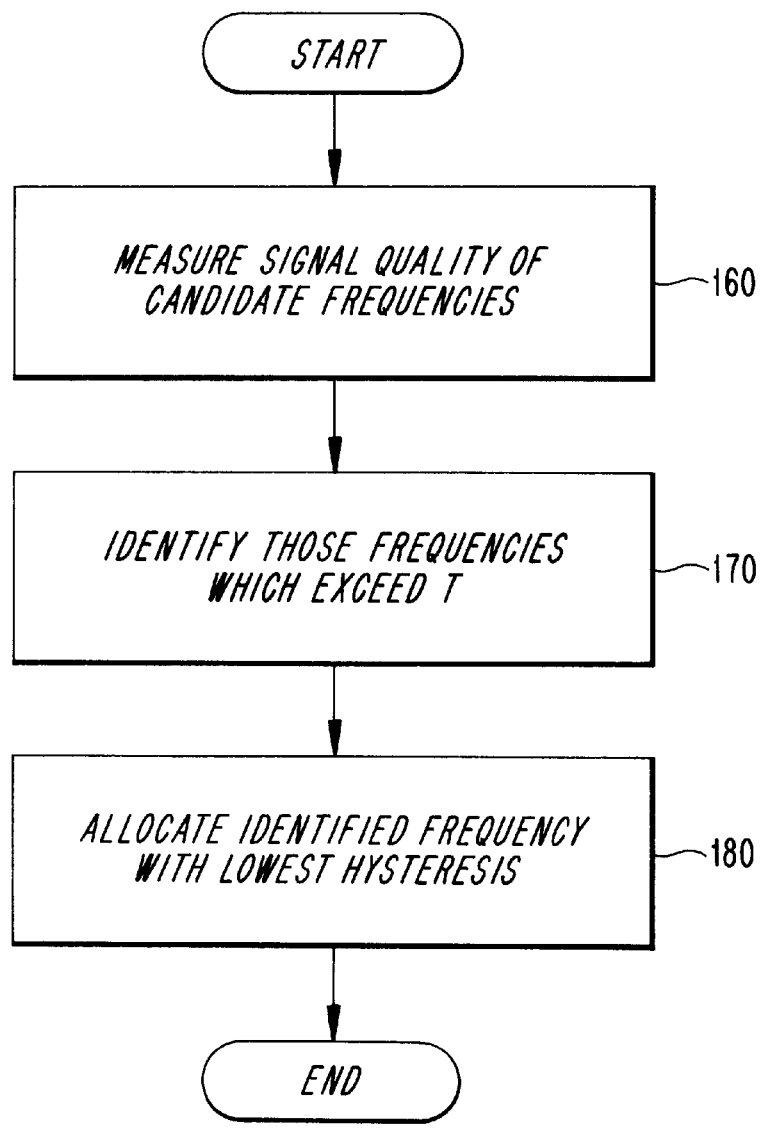

FREQUENCY PACKING FOR DYNAMIC FREQUENCY ALLOCATION IN A RADIOCOMMUNICATION SYSTEM

BACKGROUND

The present invention relates to cellular telecommunication systems, and more particularly to the automatic allocation of frequency channels to cells in a cellular telephone system.

In cellular telephone networks, maintaining or improving the speech quality in each communication channel is of great importance. One factor affecting speech quality is the level of co-channel interference. Co-channel interference results when two cells, located close to one another geographically, use the same frequency. One way to avoid this problem is to assign a dedicated group of frequency channels to each cell in the network, so that no two cells utilize the same frequency channel. While this would clearly avoid the problem of co-channel interference, the network would quickly run out of frequency channels since there are only a fixed number of frequency channels available.

To avoid running out of available frequency channels, cellular telephone networks employ reuse plans. Reuse plans allow a network to assign a frequency channel to more than one cell. While some co-channel interference is expected, excessive co-channel interference can be avoided by making sure the two or more frequency channels are only allocated in cells that are spaced sufficiently far enough apart.

In general, reuse plans are well known to those skilled in the art. A fixed reuse plan, as the term suggests, involves the assignment of a fixed, dedicated group of frequency channels to each cell in the network. Frequency channels can be assigned to more than one cell as long as the cells are located far enough apart to avoid excessive co-channel interference.

As previously mentioned, each cell in a network that employs a fixed frequency channel reuse plan will be limited to the specific frequency channels assigned; therefore, the traffic-handling capability for each cell will be limited despite the avoidance of excessive co-channel interference. In other words, fixed reuse plans are inherently inflexible; there is no provision to adjust the frequency channel allocations in each cell as demand fluctuates from cell to cell over the course of a given time period. The result is a degradation in both speech quality and traffic-handling capacity. Therefore, adaptive reuse plans, also known as adaptive or dynamic channel allocation plans, were conceived.

Adaptive frequency channel reuse plans attempt to avoid the degradation in speech quality and traffic-handling capability by providing greater flexibility. Rather than assigning a fixed group of frequency channels to each cell in the network, allocations will vary over time to meet the changing needs of each cell. The way this is accomplished is by periodically measuring the signal quality for each frequency channel in each cell. Techniques for measuring signal quality include using dedicated received signal strength transceivers (RSSI) and evaluating the bit error rate (BER) of received signals. As required, cells will have frequency channels allocated as long as the signal quality measurements for the channels meet or exceed certain signal quality criteria. For example, if cell A requires an additional frequency channel to handle an increase in telephone traffic, frequency channel X is not likely to be allocated if it is already being used in a nearby cell. Co-channel interference due to the use of frequency channel X in the nearby cell will be measured in cell A as interference. Thus, frequency channel X will not meet the required signal quality criteria.

There are different types of adaptive channel allocation plans. The primary difference between each plan is the application of criteria used to determine whether a frequency channel should or should not be allocated in a given cell at a given time. For example, H. Eriksson, "Capacity Improvement by Adaptive Channel Allocation", *IEEE Global Telecomm. Conf.*, pp. 1355–1359, Nov. 28–Dec. 1, 1988, suggests using the mobiles to measure the signal quality of the downlink for each channel, then channels are assigned on the basis of those having the highest carrier to interference (C/I) ratios. A somewhat different approach is expressed by G. Riva, "Performance Analysis of an Improved Dynamic Channel Allocation Scheme for Cellular Mobile 74 Radio Systems", *42nd IEEE Veh. Tech. Conf.*, pp. 794–797, Denver 1992, where frequency channels may be allocated if their signal quality measurements meet or exceed a preset C/I threshold. In Y. Furuya et al., "Channel Segregation, A Distributed Adaptive Channel Allocation Scheme for Mobile Communication Signals", *Second Nordic Seminar on Digital Land Mobile Radio Communication*, pp. 311–315, Stockholm, Oct. 14–16, 1986, an adaptive channel allocation plan is described whereby the recent history of previously measured signal quality for each channel is used in making channel allocation decisions.

When employing a conventional adaptive channel allocation plan, it is most effective to measure both uplink (i.e., the radio path from the mobile to the base station) and downlink (i.e., the radio path from the base station to the mobile) signal quality for each frequency channel. In digital systems such as D-AMPS (Digital Advanced Mobile Phone System), uplink measurements can be made by equipment located in the base station. Downlink measurements can be made by the mobile assisted handover (MAHO) unit in each mobile; the mobile then transmits the measurements back to the base station.

While adaptive channel allocation strategies provide a more flexible plan which ultimately leads to better signal quality and traffic-handling capacity, the criteria by which particular frequency channels are selected for allocation to a given cell have not yet been refined to consider all of the various system parameters impacted by the allocation process. For example, combiners, commonly used in cellular base stations to combine signals from several frequency channels for coupling to a base station's antenna, typically include a plurality of resonator filters each of which is tuned to a particular frequency associated with a radio channel on which the base station is to transmit. However, to avoid difficulties in tuning each resonator filter to the desired frequency, it is important to provide an excluded bandwidth around the desired frequency so that the resonator filter does not also pick up signal energy from a nearby frequency to which another resonator filter in the combiner is tuned. For example, it is common to provide an exclusionary bandwidth of up to 630 kHz around each frequency to which a resonator filter is tuned, with the size of the exclusionary bandwidth being determined based upon, for example, the frequency range and output power for transmission. This means that, in practice, a buffer of up to about 10 radio frequency channels to either side of a selected frequency will be set aside as an exclusionary bandwidth and not allocated for use by that base station.

This characteristic of combiners, however, is not taken into account in conventional dynamic frequency allocation techniques. Accordingly, as will be illustrated in more detail below, these conventional techniques do not necessarily make efficient use of the bandwidth available to each base station. Therefore, the invention presents a technique for frequency packing which takes into account the any desired frequency separation or excluded bandwidth, e.g., due to the operation of combiners, to more efficiently use the limited bandwidth available to each base station and each cell.

SUMMARY

It is an object of the present invention to provide a channel allocation strategy that considers the excluded and available bandwidth associated with a particular base station as one of the factors used to select another frequency for that base station so as to maximize the bandwidth available for subsequent selections. According to exemplary embodiments of the present invention, this object can be achieved by using a variable hysteresis factor as part of the evaluation process of candidate frequencies. For example, frequencies which are closer to the edges of exclusionary bandwidths associated with selected frequencies, e.g., those associated with already tuned resonator filters, or which are close to the boundaries of the frequency spectrum available for allocation, can be assigned a hysteresis factor which is more favorable to selection than that assigned to other channels.

In this way, the channel allocation strategy will favor the selection of frequencies which will provide a significant overlap of exclusionary bandwidths. This in turn will maximize the remaining available bandwidth for subsequent selections.

BRIEF DESCRIPTION OF THE DRAWINGS

The objects and advantages of the invention will be understood by reading the following detailed description in conjunction with the drawings in which:

FIG. 2 is a diagram showing the organization of frequency channels in each cell of a cellular network in accordance with one aspect of the invention;

FIG. 7 is a flowchart illustrating another method for allocating frequencies according to the present invention.

DETAILED DESCRIPTION

Figure 1:
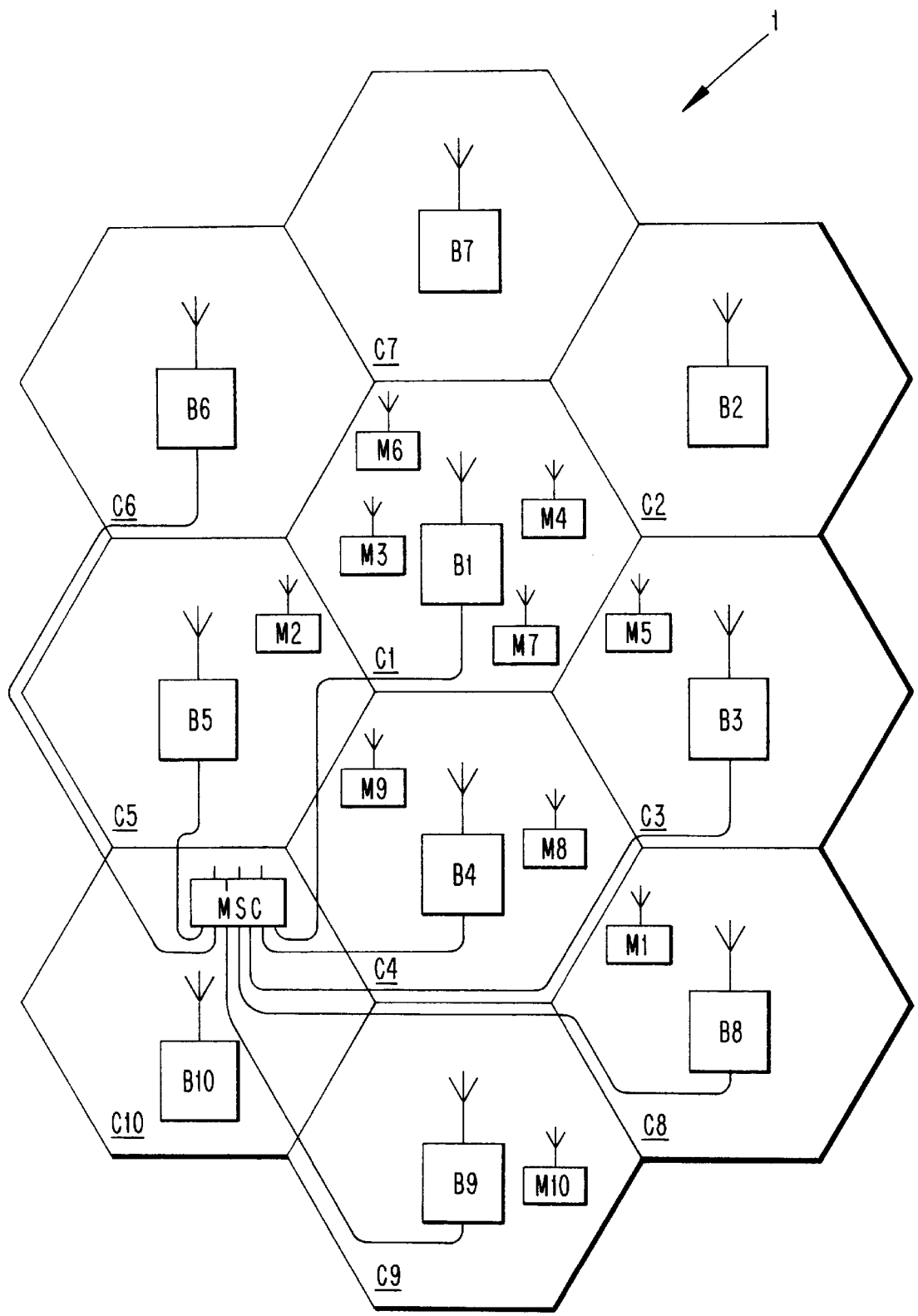
FIG. 1 is a block diagram illustrating ten cells in a cellular mobile radio telephone system to which the invention applies.

The various features of the invention will now be described with respect to the figures, in which like parts are identified with the same reference characters.

FIG. 1 is a schematic diagram illustrating the relationship between 10 cells (C1–C10) in a typical cellular telephone network 1 (herein referred to as a "cellular network") such as D-AMPS. Generally, a cellular network would have far more than ten cells including cell split areas and hierarchical cell structures including macro-cells, micro-cells and pico-cells; however, 10 is sufficient for illustrative purposes.

In each cell C1 to C10, there is a base station B1 to B10. Although FIG. 1 shows the base stations located toward the center of each cell, base stations may be located anywhere in the cell. Base stations located toward the center typically employ omrni-directional antennas, while base stations located toward a cell boundary typically employ directional antennas.

The mobiles M1–M10 represent the mobile telephone units. Of course, the mobiles can move about in one cell or they can move about from one cell to another cell. Typically, there are far more mobiles than ten. Again, showing ten mobiles is sufficient for illustrative purposes.

The cellular network 1 depicted in FIG. 1 also has a mobile switching center (MSC). The MSC connects to each of the base stations by cable, radio links, or both (not illustrated in FIG. 1). The MSC is also connected to a fixed telephone switching unit (also not illustrated in FIG. 1).

The cellular network 1 illustrated in FIG. 1 uses a fixed number of radio frequencies (channels) for communication. For example, the frequency channels correspond to the frequencies in the 800 MHz band or the 1900 MHz band. Although the invention is intended for use in a digital system for the purpose of facilitating frequency planning for digital traffic channels, the invention will work in a dual mode system where analog and digital frequencies share the spectrum in each cell or in an analog system.

In a cellular network that employs a conventional frequency allocation strategy, fixed or adaptive, each cell is allocated a number of frequency channels which correspond to a subset of all frequency channels available to the cellular network as a whole. FIG. 2 illustrates that with this invention, each cell in the network may select, for use in the cell, frequency channels from the same overall set of frequencies. For example, if there are n number of frequency channels in a cellular network comprising N number of cells, each cell could be defined by the entire set of frequency channels $f_1$ to $f_n$. While cell 1 through cell N may have the same set of frequency channels from which to select, each cell will select (i.e., allocate) from among a subset of frequency channels that meet the selection criteria.

The present invention accomplishes this in part by performing various signal quality measurements on the set of frequencies in the cell. Therefore, signal quality measurements are made not only for those frequency channels in use or available for use, but also for those frequency channels that are not currently being used or available for use, though they may become available at a later time. These various signal quality measurements can be processed, filtered, and evaluated in many different ways, the details of which are not particularly relevant for the present invention and, therefore, these details are not discussed herein. The interested reader can obtain more information on exemplary techniques for performing signal quality measurements by studying copending U.S. patent application Ser. No. 08/609,994, entitled "Adaptive Frequency Allocation in a Telecommunication System", the disclosure of which is expressly incorporated by reference herein.

Of more interest for understanding the present invention is the operation of combiners and their impact on spectral utilization, which is used here as one example of system design constraints that create frequency separation requirements. As mentioned above, combiners are used to prepare the data signals modulated onto each frequency channel for coupling to an antenna. Combiners typically include a plurality of bandpass filters which are usually implemented as large, cavity resonator filters due to the relatively large output power associated with base station transmission. However, those skilled in the art will appreciate that combiners can be implemented using other types of filters, e.g., ceramic filters. An example of a resonator filter is illustrated in FIGS. 3A–3C.

Figure 3A:
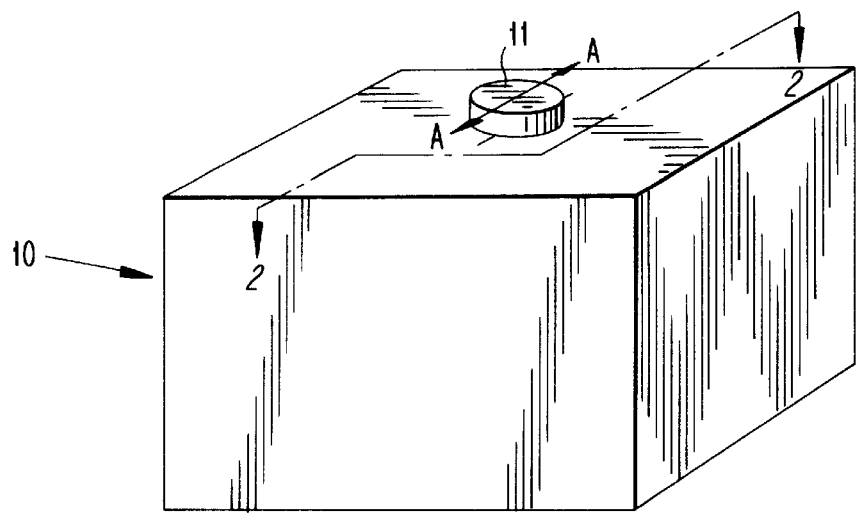
FIG. 3A is a first view of an exemplary combiner filter.

Referring now to FIG. 3A, there is a perspective view of an exemplary coaxial resonator. The coaxial resonator includes a rectangular cavity 10. Disposed on the top of the rectangular cavity 10 is a stepper motor 11 or some other adjustment device such as an adjustment screw. Preferably, the stepper motor 11 is capable of being laterally displaced in the direction of the double arrow A—A.

Figure 3B:
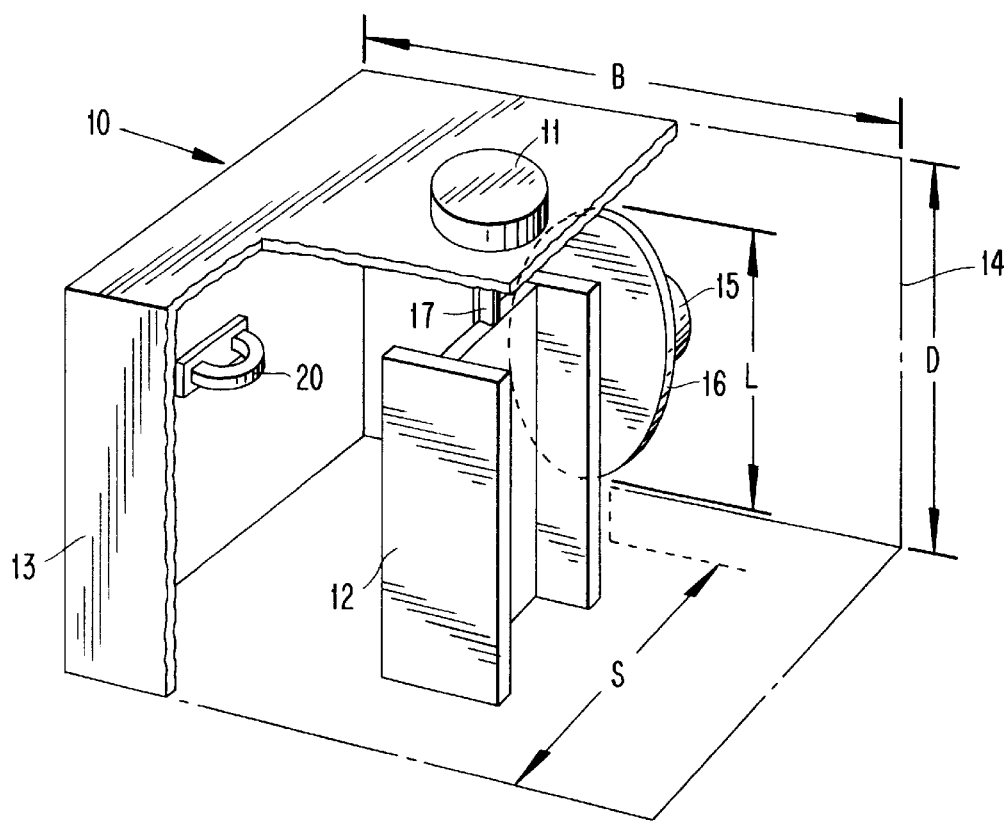
FIG. 3B is a second, cutaway view of the combiner filter of FIG. 3A.

Referring now to FIG. 3B, a cross sectional perspective view taken along the line 2—2 of FIG. 3A is provided. Disposed within the rectangular cavity 10, there is an RF output loop 20 and an I-beam shaped element 12 orthogonally placed against the electrical field between the plates that make up the capacitor. The plates of the capacitor include the front wall 13 of the rectangular cavity 10 and the closing plate 16. The I-beam shaped element 12 has the property of introducing frequency adjustment (tuning) over a wide span when rotating the I-beam in the field.

Figure 3C:
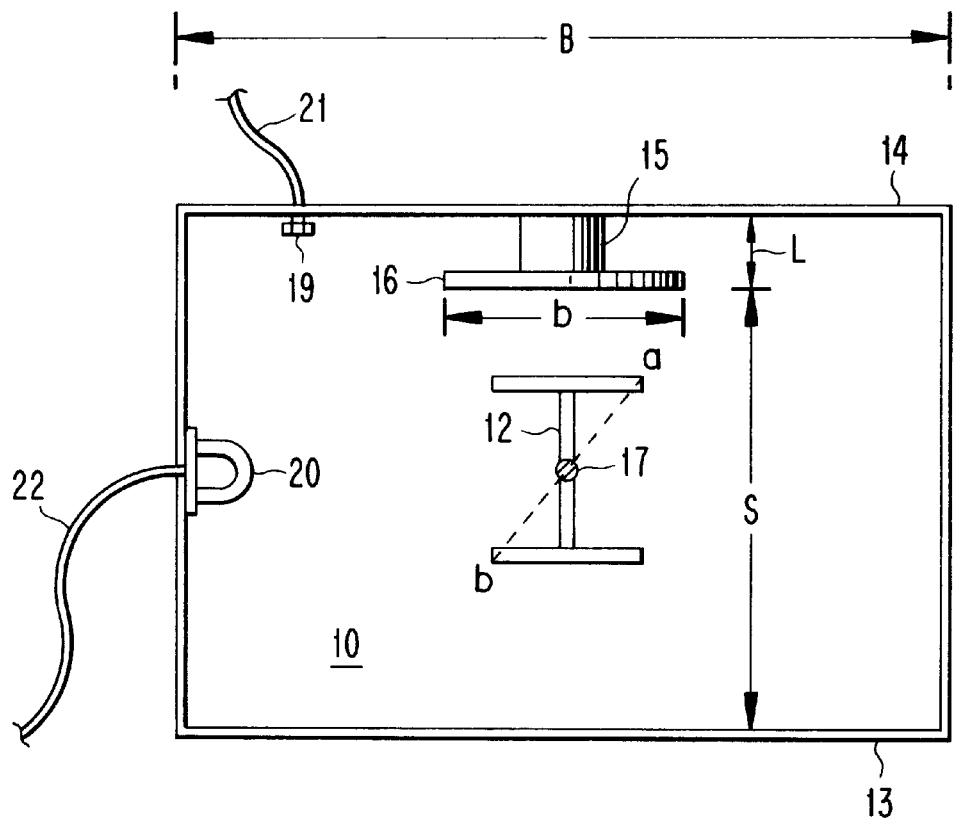
FIG. 3C is a top, cutaway view of the combiner filter of FIG. 3A.

Referring now to FIG. 3C, a plan view illustrates the rectangular cavity 10 with the top wall removed. An RF signal is input to the rectangular cavity via a coaxial cable 21 and a RF input loop 19. An RF signal is output from the rectangular cavity via a coaxial cable 22 and the RF output loop 20. The fundamental resonator frequency $f_o$ of the cavity 10 is tuned through the adjustment length (L) of a coaxial center conductor 15 and/or its closing plate 16. The design and/or dimensions of the closing plate 16 also affect the adjustment of the fundamental resonator frequency $f_o$. Rotation of the I-beam 12 is achieved using e.g., the stepper motor 11, an adjustment screw or other known adjustment means which is attached to an isolated shaft 17.

Figure 4:
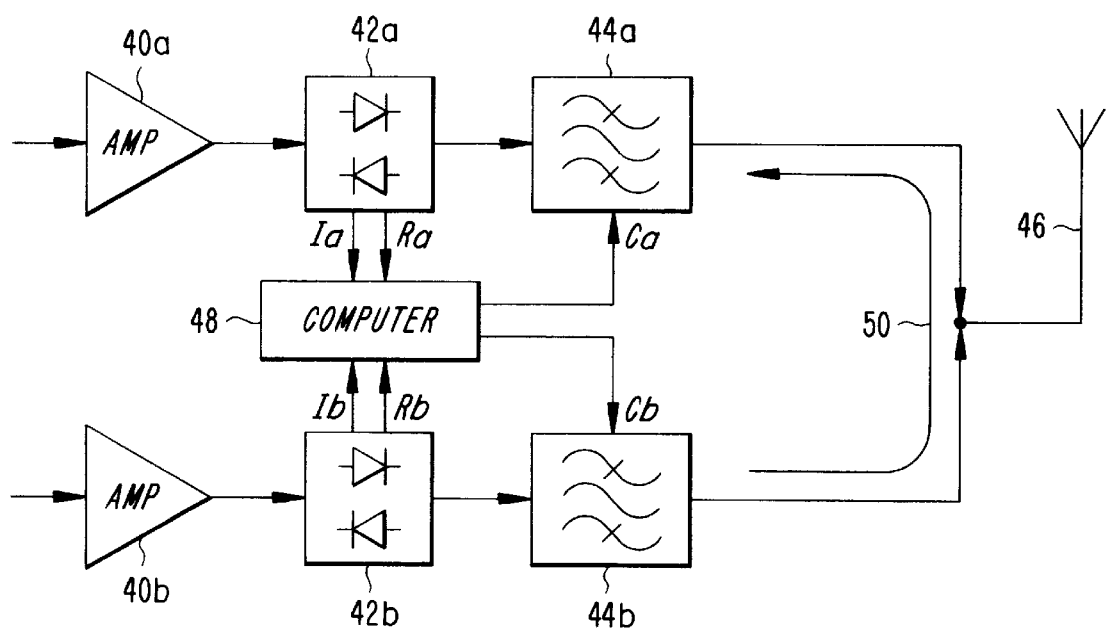
FIG. 4 is a block diagram of a portion of a base station's transmission circuitry used to describe combiner tuning.

One problem associated with these types of combiner filters is their sensitivity to interference from signals generated by other combiner filters being used in the base station. Consider, for example, the system of FIG. 4.

In this example, the combiner, for sake of simplicity, comprises only two filters, however, in a practical embodiment such a combiner is typically provided with several, for instance eight, filters. The signals that are to be combined comprise output signals from amplifiers 40a, 40b, which, through power detectors 42a, 42b, are fed to respective band pass filters 44a, 44b, e.g., cavity filters, to be combined and transmitted to the common antenna 46. The powers Ia, Ib of the input signals to filters 44a, 44b and the power Ra, Rb of the signals reflected by filters 44a, 44b are measured in respective diode detectors in power detectors 42a, 42b. Power signals Ia, Ib, Ra, Rb are delivered to a computer 48 that computes the ratio Ia/Ra and Ib/Rb, respectively. In accordance with known techniques, computer 48 adjusts a resonant frequency adjusting element for respective filter 44a, 44b using control signals Ca, Cb. The adjusting element is adjusted as long as the respective ratio increases. Thereafter the filter is considered to be correctly tuned.

A drawback of this known tuning method is that the output signal from one filter, for instance filter 44b, will influence the result of measurement for the other filter, for instance filter 44a. The reason for this is that the output signal from filter 44b is not only fed to the antenna 46 but also up to and through filter 44a, as indicated by arrow 50. Since the measurement in detector 42a is a wide band detection, the interfering signal 50 from filter 44b will also influence the measurements of Ia, Ra for filter 44a. In unfavorable cases, for instance when the output power from amplifier 40a is low while the output power from amplifier 40b is high, the interfering signal 50 after passage through filter 44a can be of the same order of magnitude as the reflected signal Ra.

One solution to this problem is to provide an exclusionary bandwidth around each frequency that has been allocated to a particular base station so that the signal energy from an output of one combiner filter does not influence the tuning of another combiner filter. The size of this exclusionary bandwidth, sometimes referred to as combiner channel separation, will be determined based upon various system parameters such as the output transmit power and frequency band of operation. For example, the greater the output power and the higher the frequency band, the larger the exclusionary bandwidth that is needed to avoid interference between the combiner filters. Thus, the exclusionary bandwidth can be, for example, 0–630 kHz, with a typical 800 MHz, macro-cell base station employing an exclusionary bandwidth of about 360 kHz and a typical 1900 MHz macrocell base station employing an exclusionary bandwidth of about 630 kHz.

Figure 5A:
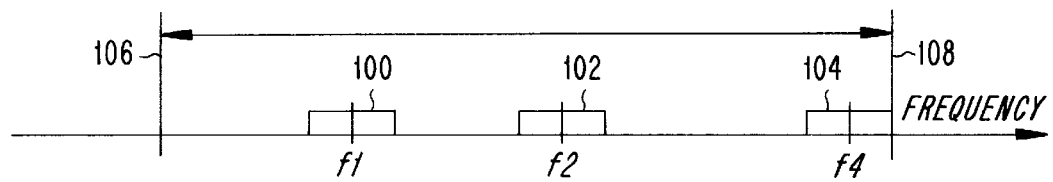
FIG. 5A is a graph illustrating spectrum availability according to an exemplary scenario.

The effect of the combiners' exclusionary bandwidth on frequency allocation is graphically illustrated in FIG. 5A. Therein, a base station currently has allocated thereto three transmit frequencies f1, f2 and f4. Centered about each of these three frequencies are rectangles 100, 102 and 104 which graphically represent the exclusionary bandwidth around each transmit frequency which has been assigned based on the allocation of frequencies f1, f2 and f4 to this base station. Lines 106 and 108 represent the boundaries of the available spectrum for allocation as determined by, for example, the applicable system standard.

When another connection needs to be supported by this base station, another frequency is allocated to join the exemplary group illustrated in FIG. 5A. Conventionally, the selection of another frequency was made based on one or more predetermined selection criteria which typically focused on selecting an available frequency that provided the highest received signal quality. For example, suppose that the particular base station involved in this example of FIG. 5A needed to add two more frequencies to support two additional connections. Further, suppose that upon evaluation of the available frequencies, i.e., those within boundaries 106 and 108, but outside of the exclusionary bandwidths 100, 102 and 104, the base station (or the network) has identified two frequencies f0 and f3 as optimal candidates to support the new connections. This results in, for example, the allocated spectrum for this particular base station illustrated in FIG. 5B. Note that two new exclusionary bandwidths, 110 and 112, have been assigned that correspond to the newly allocated frequencies f0 and f3, respectively.

Although the newly allocated frequencies f0 and f3 may provide optimal received signal quality as compared with other candidate frequencies, their selection may not be optimal from a spectral efficiency perspective. As traffic increases in this cell, the base station (or network) has fewer and fewer choices available for frequencies to support new connections, as the gaps between exclusionary bandwidths become smaller and smaller. In fact, Applicants have noted that the exclusionary bandwidths needed to support combiner operation may result in calls being blocked due to a lack of any remaining frequencies that are not excluded from selection, particularly for high power, PCS installations.

Accordingly, the present invention maximizes the bandwidth available to each base station by introducing consideration of currently allocated frequencies, and their corresponding exclusionary bandwidths, into the selection criteria for allocating new frequencies. In particular, the present invention favors the allocation of new frequencies whose exclusionary bandwidth overlaps either (1) an existing exclusionary bandwidth for that base station or (2) frequencies that are outside of the available band for transmission. An exemplary implementation of this invention will now be described with reference to FIG. 5C.

Therein, the example of FIG. 5A is repeated, wherein the system or the base station again needs to allocate two new frequencies in addition to frequencies f1, f2 and f4 which are currently allocated. However, in addition to considering the signal quality of the available frequencies (using any desired signal quality criteria as described above), this technique according to the present invention also considers the frequency spacing between candidate frequencies and border frequencies established by the edges of the exclusionary bandwidths 100, 102 and 104 as well as the boundaries of the available spectrum 106 and 108. In this example, the dotted lines in FIG. 5C denote a variable hysteresis which can be subtracted from a determined signal quality for each candidate frequency under evaluation. Note that the hysteresis illustrated in FIG. 5C varies as a function of frequency in such a way that the closer a candidate frequency is to either a border frequency of an existing exclusionary bandwidth or a boundary of the available spectrum, the lower the associated hysteresis. Thus, assuming that the adjusted signal quality is considered to be the measured signal quality minus this variable hysteresis value, as indicated by the equation below:

$$\text{adjusted sq} = \text{measured sq} - \text{hysteresis sq}(f)$$

then the present invention will favor the selection of frequencies which are within a predetermined spacing of either the border frequencies or boundary frequencies described above. As can be seen from the figure, at some distance from either the border frequencies of the exclusionary bandwidths or the boundary frequencies, the allocation strategy according to the present invention may provide the same hysteresis value for a range of frequencies. This is because the selection of any of the frequencies in this range, e.g., those between frequencies fx and fz, do not maximize the spectrum available to this base station and, thus, are not favored relative to one another.

Figure 5B:
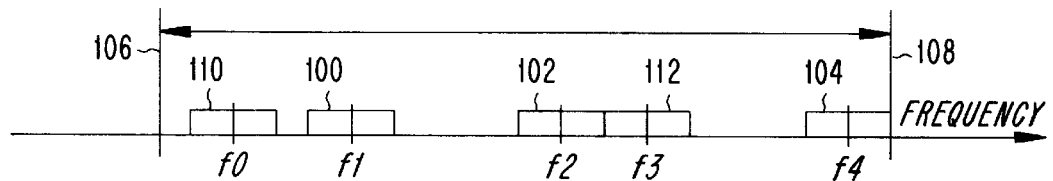
FIG. 5B is a diagram showing how two additional frequencies might be added to the scenario of FIG. 5A using conventional techniques.
Figure 5C:
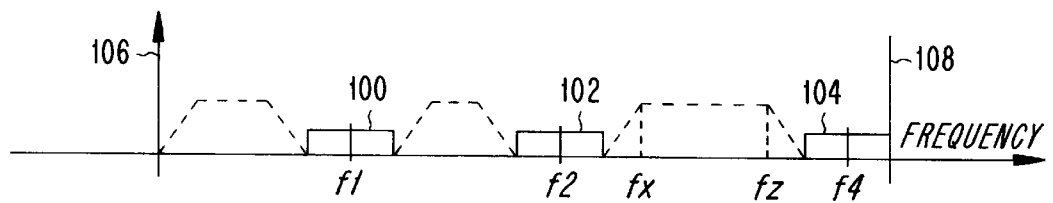
FIG. 5C is a diagram illustrating variable hysteresis factors according to an exemplary embodiment of the present invention.
Figure 5D:
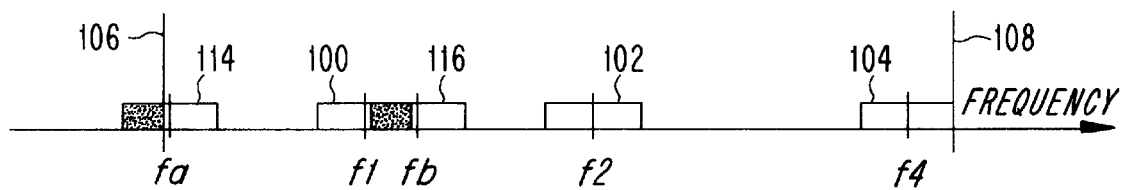
FIG. 5D is a diagram illustrating an exemplary frequency allocation showing how two additional frequencies might be added to the scenario of FIG. 5A according to an exemplary embodiment of the present invention.

Applying this variable hysteresis, or any other technique which takes into account the exclusionary bandwidths associated with currently allocated frequencies and their tuned combiner filters, the present invention might, as opposed to the allocation described with respect to FIG. 5B, instead allocate new frequencies fa and fb as shown in FIG. 5D. Note that the selection of frequencies fa and fb for the newly allocated channels provides a much higher degree of spectral efficiency for this particular base station than the allocation of FIG. 5B, because of the overlap between the newly assigned exclusionary bandwidths 114 and 116 and frequencies outside the available spectrum or an exclusionary bandwidth associated with an already allocated frequency. In particular, note the grayed area associated with the exclusionary bandwidth 114 which is outside of the boundary frequency 106. Since this grayed portion of the spectrum already could not be allocated for another channel for handling traffic by this base station, the selection of frequency fa is spectrally efficient. Similarly, the selection of fb was such that its exclusionary bandwidth 116 substantially overlapped with a portion of the exclusionary bandwidth 100 associated with frequency f1. Again, the grayed portion of the exclusionary bandwidth 116 denotes the overlap and hence the spectral savings when compared with the selection of, for example, frequency f3 in FIG. 5B.

Figure 6:
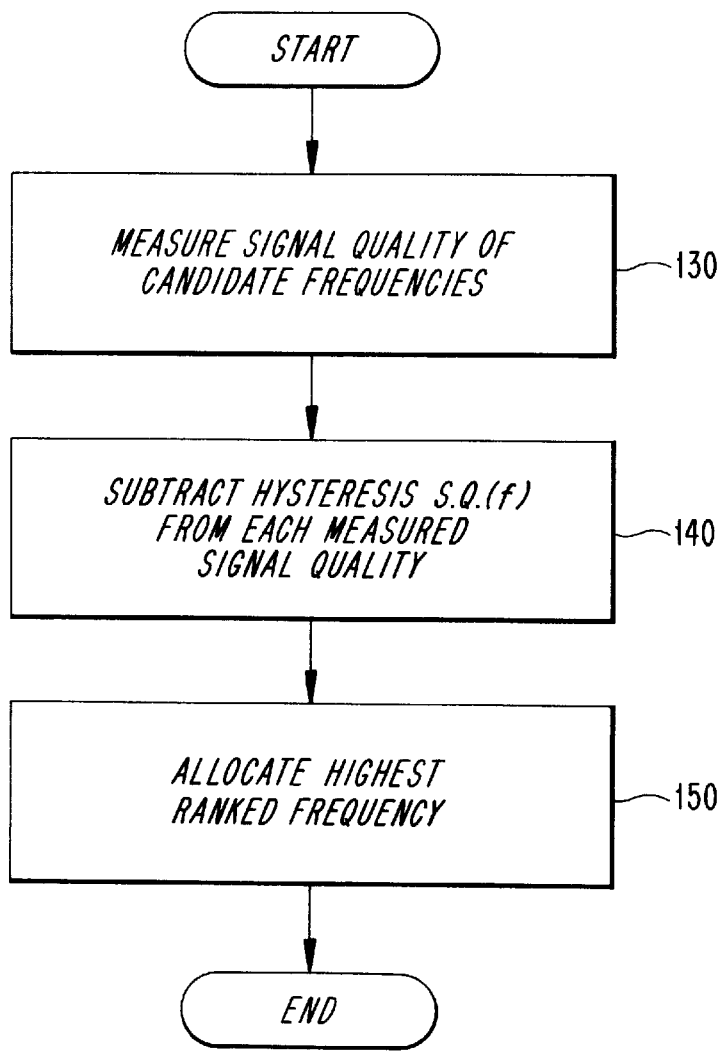
FIG. 6 is a flowchart illustrating a method for allocating frequencies according to the present invention.

Thus, a method according to the present invention for allocating frequency channels on a dynamic basis, which takes into account the exclusionary bandwidths associated with, for example, combiners and spectral borders, can be summarized by the flowchart of FIG. 6. Therein, a first step according to exemplary embodiments of the present invention is to measure the signal quality of the candidate or available frequencies at block 130. Again, any type of signal quality measure (e.g., signal strength, bit error rate, etc.) is contemplated by the present invention. Next, at step 140, a hysteresis value associated with each particular candidate frequency is subtracted from the measured signal quality to provide an adjusted signal quality value which is weighted based upon the spectral efficiency of each particular candidate frequency given the particular exclusions associated with a base station. Next, the highest ranked frequency can then be allocated at step 150, which ranking implements the system designer's desired tradeoff between signal quality and spectral efficiency. That is, the function which is used to define the hysteresis based on the frequency spacing can be tailored to provide whatever desired tradeoff between efficiency and signal quality is desired. For example, although the illustrative embodiment of FIG. 5C depicts hysteresis functions that vary linearly with respect to the distance from a border frequency or a boundary of the available spectrum, those skilled in the art will appreciate that these hysteresis functions may also be non-linear.

An alternative method is depicted by the flowchart of FIG. 7. Therein, the signal quality of available (candidate) frequencies is measured at step 160. Next, at step 170, the measured signal quality values are compared with a threshold T for signal quality. The threshold T can be set, for example, to a desired value that represents some minimum acceptable signal quality for allocation. The threshold can vary based upon a spacing of the frequency channel from the border frequency. Those frequencies which are identified as exceeding the threshold T are then further evaluated to determine which frequency has the lowest hysteresis value associated therewith. This frequency is then allocated at step 180.

The invention has been described with reference to several exemplary embodiments. However, it will be readily apparent to those skilled in the art that it is possible to embody the invention in specific forms other than those of the preferred embodiments described above. This may be done without departing from the spirit of the invention. The preferred embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. In a radiocommunication system, a method for allocating a frequency channel comprising the steps of:

(a) measuring a signal quality of said frequency channel;

(b) comparing said measured signal quality with a threshold signal quality; wherein said threshold signal quality can vary based upon a spacing of said frequency channel from a border frequency wherein said border frequency is an end of an excluded frequency range established for a combiner filter;

(c) selectively identifying said frequency channel as a candidate for allocation based upon a result of said comparison;

(d) repeating steps (a)–(c) for other frequency channels; and (e) selectively allocating said frequency channel if said frequency channel has been identified as a candidate and based upon a comparison of said frequency channel with other candidate frequency channels.

2. The method of claim 1, wherein the step of comparing said measured signal quality with a threshold signal quality further comprises the steps of:

establishing a hysteresis factor which is a non-constant function of frequency spacing from a border frequency;

evaluating said non-constant function to determine a value of said hysteresis factor for said frequency channel; and fusing said value to determine said threshold signal quality.

3. The method of claim 1, wherein said combiner filter is a tuned resonant filter.

4. The method of claim 1, wherein said combiner filter is a ceramic filter.

5. A radiocommunication system comprising:

a base station including a combiner for combining radio signals for transmission, said combiner including at least one combiner filter tuned to a predetermined frequency; and means for allocating a candidate frequency to said base station based upon a spacing between said candidate frequency and an exclusionary bandwidth surrounding said predetermined frequency, wherein said means for allocating uses a hysteresis which varies as a function of said spacing.

6. The radiocommunication system of claim 5, wherein said combiner filter is a resonator filter.

7. The radiocommiunication system of claim 5, wherein said combiner filter is a ceramic filter.

8. The radiocommunication system of claim 5, wherein said means for allocating is disposed within said base station.

9. The radiocommunication system of claim 5, wherein said function favors frequencies that are closer to said exclusionary bandwidth.

10. In a radiocommunication system, a method for allocating a frequency channel comprising the steps of:

(a) measuring a signal quality of said frequency channel;

(b) comparing said measured signal quality with a threshold signal quality;

(c) identifying said frequency channel as a candidate for allocation if said measured signal quality exceeds threshold signal quality;

(d) repeating steps (a)–(c) for other frequency channels; and (e) allocating said frequency channel if said frequency channel has been identified as a candidate and based upon a comparison of a hysteresis value associated with said frequency channel with hysteresis values associated with other candidate frequency channels wherein said hysteresis values are determined based on a border frequency which is an end of an excluded frequency range established for a combiner filter.

11. The method of claim 10, wherein the step of allocating said frequency channel further comprises the steps of:

establishing a non-constant hysteresis function of frequency spacing from a border frequency; and evaluating said hysteresis function to determine said hysteresis values for said candidate frequency channels.

12. The method of claim 12, wherein said combiner filter is a tuned resonant filter.

13. The method of claim 12, wherein said combiner filter is a ceramic filter.

14. In a radiocommunication system, a method for allocating a frequency channel comprising the steps of:

(a) measuring a signal quality of said frequency channel;

(b) establishing a hysteresis factor which is a non-constant function of frequency spacing from a border frequency;

(c) evaluating said non-constant function to determine a value of said hysteresis factor for said frequency channel; and (d) using said value and said measured signal quality to selectively allocate said frequency channel.

15. The method of claim 14, wherein said border frequency is an end of an excluded frequency range established for a combiner filter.

16. The method of claim 15, wherein said combiner filter is a tuned resonant filter.

17. The method of claim 15, wherein said combiner filter is a ceramic filter.

* * * * *